US012416535B2

(12) United States Patent
Zhou et al.

(10) Patent No.: US 12,416,535 B2
(45) Date of Patent: Sep. 16, 2025

(54) ROBOTIC STRAIN SENSOR WITH HIGHER DETECTION SENSITIVITY

(71) Applicant: GREE ELECTRIC APPLIANCES, INC. OF ZHUHAI, Zhuhai (CN)

(72) Inventors: Dan Zhou, Zhuhai (CN); Tuo Wang, Zhuhai (CN); Weicai Huang, Zhuhai (CN); Bailu Liu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 290 days.

(21) Appl. No.: 18/006,381

(22) PCT Filed: Aug. 2, 2021

(86) PCT No.: PCT/CN2021/110013
§ 371 (c)(1),
(2) Date: Jan. 20, 2023

(87) PCT Pub. No.: WO2022/088818
PCT Pub. Date: May 5, 2022

(65) Prior Publication Data
US 2023/0288271 A1    Sep. 14, 2023

(30) Foreign Application Priority Data
Oct. 28, 2020   (CN) .......................... 202011176430.0

(51) Int. Cl.
*G01L 1/22*    (2006.01)
*B25J 19/02*   (2006.01)
(52) U.S. Cl.
CPC .......... *G01L 1/2206* (2013.01); *G01L 1/2287* (2013.01); *B25J 19/02* (2013.01)
(58) Field of Classification Search
None
See application file for complete search history.

(56) References Cited

U.S. PATENT DOCUMENTS 2,334,671  A    11/1943  Gibbons
4,160,377  A     7/1979  Pechuk et al.
(Continued)

FOREIGN PATENT DOCUMENTS

CN    204679028 U  *  9/2015
CN    106153237 A     11/2016
(Continued)

OTHER PUBLICATIONS

International Search Report and Written Opinion mailed Sep. 26, 2021, issued in corresponding International Application No. PCT/CN2021/110013, filed Aug. 2, 2021, 14 pages.
(Continued)

*Primary Examiner* — John E Breene
*Assistant Examiner* — Nigel H Plumb
(74) *Attorney, Agent, or Firm* — Christensen O'Connor Johnson Kindness PLLC

(57) ABSTRACT

A strain sensor is disclosed. The strain sensor includes: a base provided with a mounting recess; a mounting structure disposed on the base and located in the mounting recess, a preset gap being formed between the mounting structure and an inner surface of the mounting recess; a bearing structure mounted in the mounting recess and located outside the preset gap; and a wire set of a plurality of electrically conductive wires, at a side of the wire set each of the wires being fixedly disposed on the bearing structure, and at another side of the wire set each of the wires being fixedly arranged on the mounting structure to detect strain based on change of resistance of the wire set by a load applied through the bearing structure on the wire set.

20 Claims, 6 Drawing Sheets

(56) References Cited

U.S. PATENT DOCUMENTS

2010/0288041 A1\* 11/2010 Pierce ............... G01N 3/00
                                                                         73/161
2013/0186208 A1    7/2013 Lee et al.

FOREIGN PATENT DOCUMENTS

| CN | 106556488 | A | | 4/2017 | | |
|---|---|---|---|---|---|---|
| CN | 107044898 | A | | 8/2017 | | |
| CN | 110274714 | A | \* | 9/2019 | ............... | G01L 1/22 |
| CN | 110608824 | A | | 12/2019 | | |
| CN | 112179534 | A | | 1/2021 | | |
| CN | 213091041 | U | | 4/2021 | | |
| GB | 757211 | A | | 9/1956 | | |
| JP | 1992063475 | U | | 9/1992 | | |
| JP | 2018-146309 | A | | 8/2018 | | |
| JP | 2019-503483 | | | 2/2019 | | |

OTHER PUBLICATIONS

Extended European Search Report issued Feb. 20, 2024 in corresponding Application No. EP 21884553.5, filed Aug. 2, 2021, 5 pages.
Notice of Reasons for Refusal mailed Dec. 26, 2023, issued in corresponding Japanese Patent Application No. 2023-503211, published Jan. 27, 2023, 8 pages.
Office Action mailed Apr. 24, 2025, in corresponding Chinese application No. 202011176430.0, filed Oct. 28, 2020, 15 pages.

\* cited by examiner

ROBOTIC STRAIN SENSOR WITH HIGHER DETECTION SENSITIVITY

CROSS-REFERENCE TO RELATED APPLICATIONS

This application is a National Stage of International Application No. PCT/CN2021/110013, filed Aug. 2, 2021, which claims priority to Chinese Invention Patent Application No. 202011176430.0, filed on Oct. 28, 2020, entitled "STRAIN SENSOR AND ROBOT HAVING THE SAME" the contents of which are hereby incorporated by reference in their entirety.

TECHNICAL FIELD

The present disclosure relates to a strain sensor and a robot.

BACKGROUND

Currently, a six-dimensional force sensor refers to a sensor which is configured to detect forces in directions of X, Y, and Z axes in space and force moments with respect to respective axes. In some examples, the principle of action of the six-dimensional force sensor is the resistance strain effect. A strain gauge is generally formed by wrapping a constantan grid filament on a substrate and attached to a location of an elastomer (i.e., force location) to obtain a force or a force moment by detecting a strain value of the strain gauge.

However, the strain gauge is connected to the elastomer (i.e., force location) by an adhesive layer, which results in mechanical errors such as creep, hysteresis, and drift (zero drift, temperature drift) in the sensor that affect the sensitivity of the sensor, thus affecting the detection sensitivity of the sensor.

SUMMARY

The present disclosure provides a strain sensor. The strain sensor includes: a base provided with a mounting recess; a mounting structure disposed on the base and located in the mounting recess, a pre-defined gap being formed between the mounting structure and an inner surface of the mounting recess; a bearing structure mounted in the mounting recess and located outside the pre-defined gap; and a wire set, a side of the wire set being disposed on the bearing structure, and another side of the wire set being disposed on the mounting structure.

The present disclosure also provides a robot including the above-described strain sensor.

BRIEF DESCRIPTION OF THE DRAWINGS

The accompanying drawings, which constitute part of the present disclosure, are used to provide further understanding of the present disclosure, and exemplary embodiments of the present disclosure and the description thereof are used to explain the present disclosure and not intended to inappropriately limit the present disclosure. In the drawings.

Figure 1:
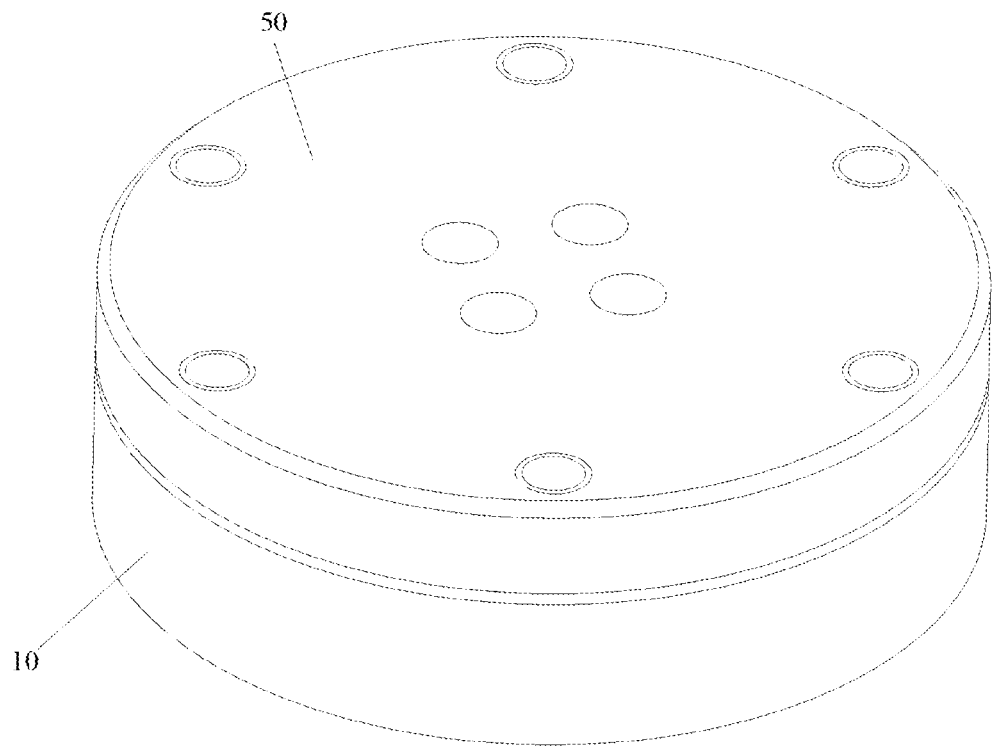
FIG. 1 is a structural schematic perspective view of a strain sensor according to some embodiments of the present disclosure.

Reference numerals in the drawings:
10—base; 11—mounting recess; 20—mounting structure; 21—predefined gap; 22—first winding part; 221—first protrusion; 2211—first wire passing hole; 23—first surface; 24—second surface; 30—bearing structure; 31—second winding part; 311—second protrusion; 3111—second wire passing hole; 32—bearing body; 33—winding body; 40—wire set; 41—first wire sub-set; 411—first wire; 412—second wire; 413—fifth wire; 414—sixth wire; 415—ninth wire; 416—tenth wire; 417—thirteenth wire; 418—fourteenth wire; 42—second wire sub-set; 421—third wire; 422—fourth wire; 423—seventh wire; 424—eighth wire; 425—eleventh wire; 426—twelfth wire; 427—fifteenth wire; 428—sixteenth wire; 50—cover; and 60—fixing structure.

DETAILED DESCRIPTION

It should be noted that the embodiments and the features of the embodiments of the present disclosure may be combined with each other under the condition of no conflict. The present disclosure will be described in detail below with reference to the accompanying drawings and in conjunction with embodiments.

It should be pointed out that unless otherwise defined, all the technical and scientific terms used herein have the same meaning as commonly understood by the person skilled in the art to which the present disclosure belongs In the present disclosure, unless otherwise stated, orientation terms such as "up" and "down" are usually used for directions shown in the drawings, or for vertical, perpendicular, or gravity directions. Similarly, for ease of understanding and description, "left" and "right" usually refer to left and right shown in the drawings; and "inside" and "outside" refer to inside and outside relative to the outline of each component itself. Those orientation terms are not intended to limit the present disclosure.

In order to solve the problem that the strain sensor in the related art has phenomena such as creep, hysteresis, and shift which affect the detection sensitivity thereof, a strain sensor and a robot are provided in embodiments of the present disclosure.

As shown in FIGS. 1 to 7, the strain sensor includes a base 10, a mounting structure 20, a bearing structure 30, and a wire set 40. The base 10 is provided with a mounting recess 11. The mounting structure 20 is disposed on the base 10 and located in the mounting recess 11. A pre-defined gap 21 is formed between the mounting structure 20 and an inner surface of the mounting recess 11. The bearing structure 30 is mounted in the mounting recess 11 and located outside the pre-defined gap 21. A side of the wire set 40 is disposed on the bearing structure 30, and another side of the wire set 40 is disposed on the mounting structure 20.

In this embodiment, the bearing structure 30 is directly connected to the wire set 40. In the detection process using the strain sensor, the load is directly applied onto the wire set 40 through the bearing structure 30 to take maximum advantage of the resistance strain effect of the wire set 40, which makes the response of the strain sensor more sensitive, eliminates the affection of the creep and the hysteresis of an elastomer on the detection sensitivity of the strain sensor, and thus solves the problem that the strain sensor in the related art has phenomena such as creep, hysteresis, and shift which affect the detection sensitivity thereof, thereby increasing the detection sensitivity and the response speed of the strain sensor and also increasing the detection precision of the strain sensor.

In this embodiment, the wire set 40 is formed by winding a wire on the bearing structure 30 and the mounting structure 20.

In some embodiments, there are a plurality of wire sets 40 arranged along an inner circumference of the mounting recess 11 and spaced from each other. There are a plurality of mounting structures 20 arranged correspondingly to the plurality of wire sets 40. In this way, in one hand, the above configuration ensures that the strain sensor is able to detect acting forces, force moments, or accelerated speeds in multiple directions, thereby widening the detection range of the strain sensor. In the other hand, the above configuration increases the detection sensitivity of the strain sensor.

In this embodiment, there are eight wire sets 40 arranged along the inner circumference of the mounting recess 11 and spaced from each other, and eight mounting structures 20 disposed correspondingly to the eight wire sets 40 in a one-to-one manner, so that the distribution of the wire sets 40 are more reasonable and compact, thereby decreasing the processing difficulty for the operator.

It should be noted that the number of the wire sets 40 is not limited herein and may be adjusted according to operating conditions. In some embodiments, the number of the wire sets 40 is four, six, ten, or twelve.

It should be noted that the number of the mounting structures 20 is not limited herein and may be adjusted according to operating conditions. In some embodiments, the number of the mounting structures 20 is four, six, ten, or twelve.

Figure 7:
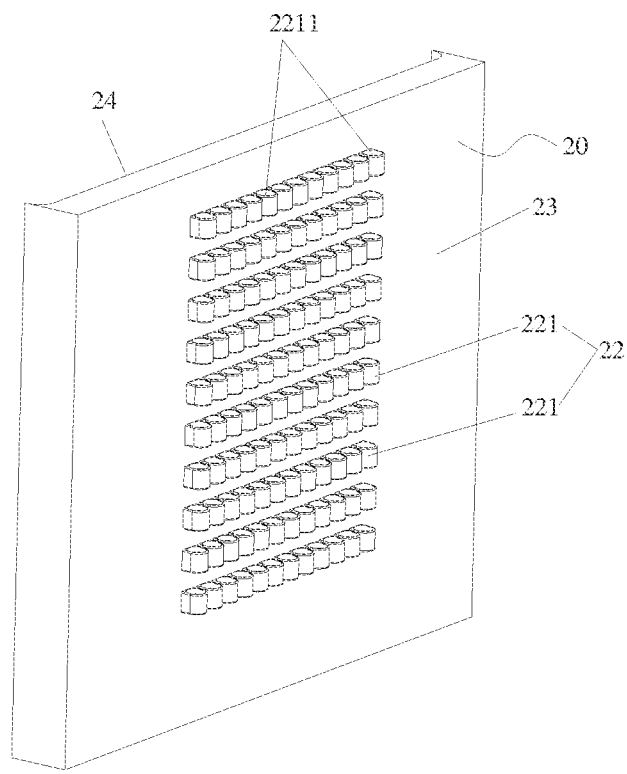
FIG. 7 is a structural schematic perspective view of a mounting structure of the strain sensor in FIG. 3.

As shown in FIG. 7, the mounting structure 20 is provided with a first winding part 22 thereon. The first winding part 22 includes a plurality of first protrusions 221 arranged in a first pre-defined direction and a second pre-defined direction and spaced from each other. The first protrusion 221 is provided with a first wire passing hole 2211 configured to allow the wire set 40 to pass therethrough. The first pre-defined direction and the second pre-defined direction are defined at an angle therebetween. In some embodiments, the first pre-defined direction is perpendicular to the second pre-defined direction. In this way, in the process of winding the wire by an operator, the wire passes through the first wire passing holes 2211 so that the fixation and the winding of the wire by the operator are easier and simpler, thereby decreasing the operating difficulty.

In this embodiment, the first pre-defined direction is a height direction of the strain sensor, and the first wire passing hole 2211 extends in the first pre-defined direction.

It should be noted that the arrangement direction of the plurality of first protrusions 221 is not limited herein and may be adjusted according to operating conditions. In other embodiments which are not shown in the drawings, the first winding part includes a plurality of first protrusions arranged in a first pre-defined direction and spaced from each other. In this way, in the process of winding the wire by an operator, the wire passes through the first wire passing holes, so that the fixation and the winding of the wire by the operator are easier and simpler, thereby decreasing the operating difficulty.

In other embodiments which are not shown in the drawings, the first winding part includes a plurality of first protrusions arranged in a second pre-defined direction and spaced from each other. In this way, in the process of winding the wire by an operator, the wire passes through the first wire passing holes, so that the fixation and the winding of the wire by the operator are easier and simpler, thereby decreasing the operating difficulty.

Figure 5:
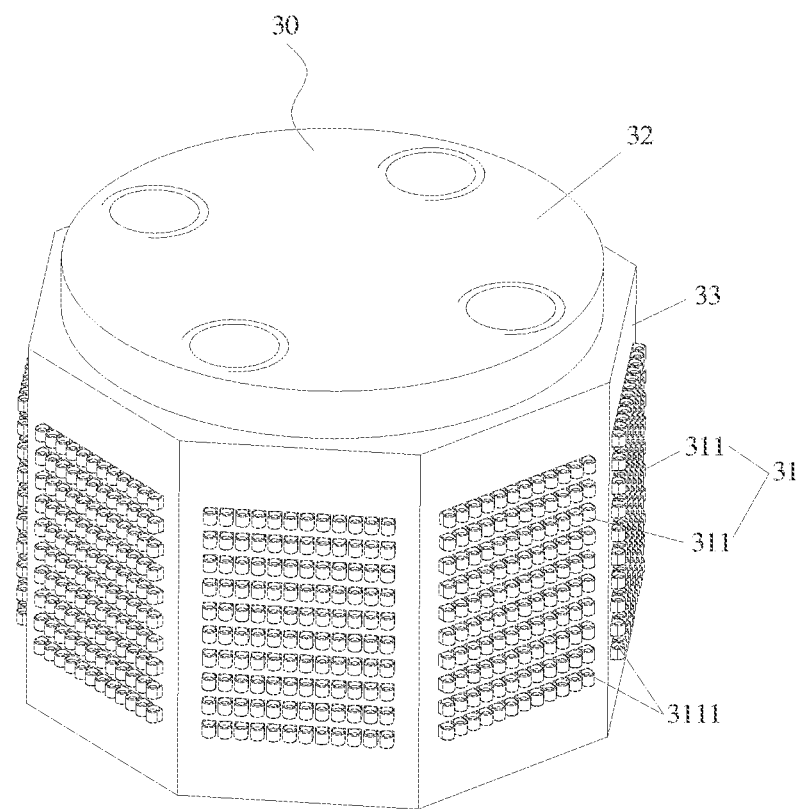
FIG. 5 is a structural schematic perspective view of a bearing structure of the strain sensor in FIG. 3.
Figure 6:
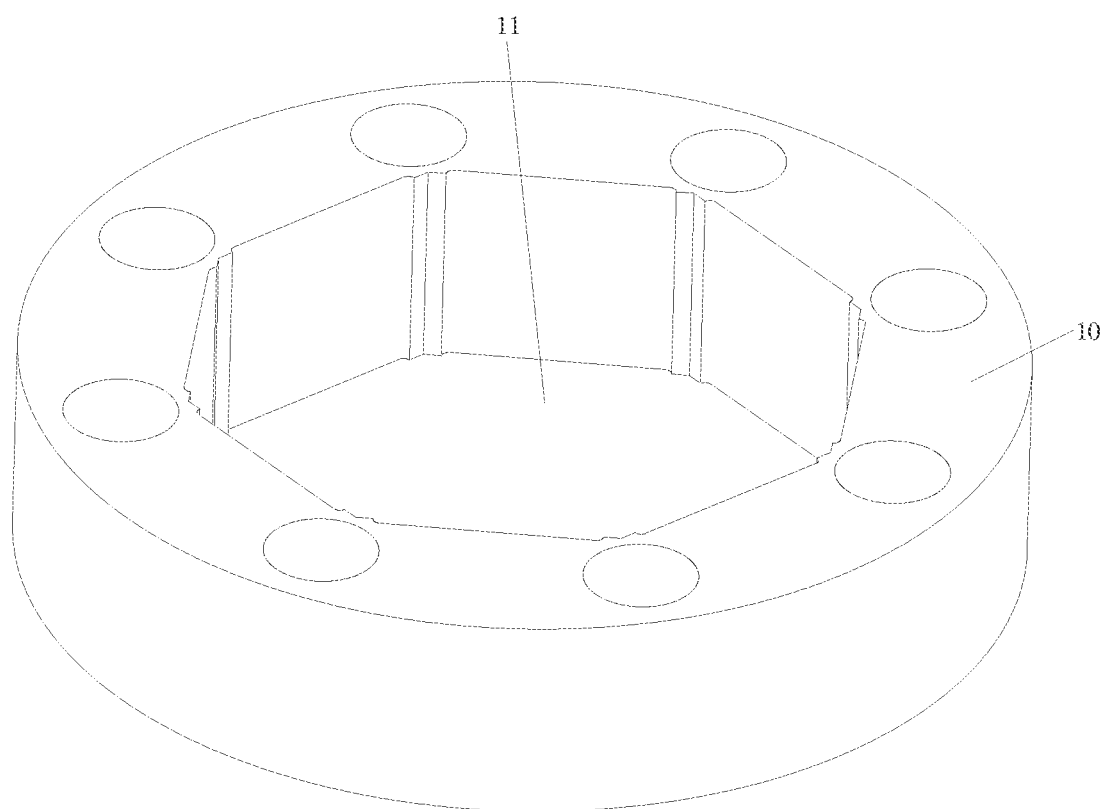
FIG. 6 is a structural schematic perspective view of a base of the strain sensor in FIG. 3.

As shown in FIG. 5, the bearing structure 30 is provided with a second winding part 31 thereon. The second winding part 31 includes a plurality of second protrusions 311 arranged in a first pre-defined direction and a second pre-defined direction and spaced from each other. The second protrusion 311 is provided with a second wire passing hole 3111 configured to allow the wire set 40 to pass therethrough. The first pre-defined direction and the second pre-defined direction are defined at an angle therebetween. In this way, in the process of winding the wire by an operator, the wire passes through the first wire passing holes 2211 and the second wire passing holes 3111, so that the fixation and the winding of the wire by the operator are easier and simpler, thereby decreasing the operating difficulty. In addition, the above configuration improves the structure stability of the wire set 40 and thus improves the detection stability and the operational reliability of the strain sensor.

In this embodiment, the second wire passing hole 3111 extends in the first pre-defined direction.

It should be noted that the arrangement direction of the plurality of second protrusions 311 is not limited herein and may be adjusted according to operating conditions. In other embodiments which are not shown in the drawings, the second winding part includes a plurality of second protrusions arranged in a first pre-defined direction and spaced from each other. In this way, in the process of winding the wire by an operator, the wire passes through the first wire passing holes and the second wire passing holes, so that the fixation and the winding of the wire by the operator are easier and simpler, thereby decreasing the operating difficulty.

In other embodiments which are not shown in the drawings, the first winding part includes a plurality of second protrusions arranged in a second pre-defined direction and spaced from each other. In this way, in the process of winding the wire by an operator, the wire passes through the first wire passing holes and the second wire passing holes, so that the fixation and the winding of the wire by the operator are easier and simpler, thereby decreasing the operating difficulty.

Figure 2:
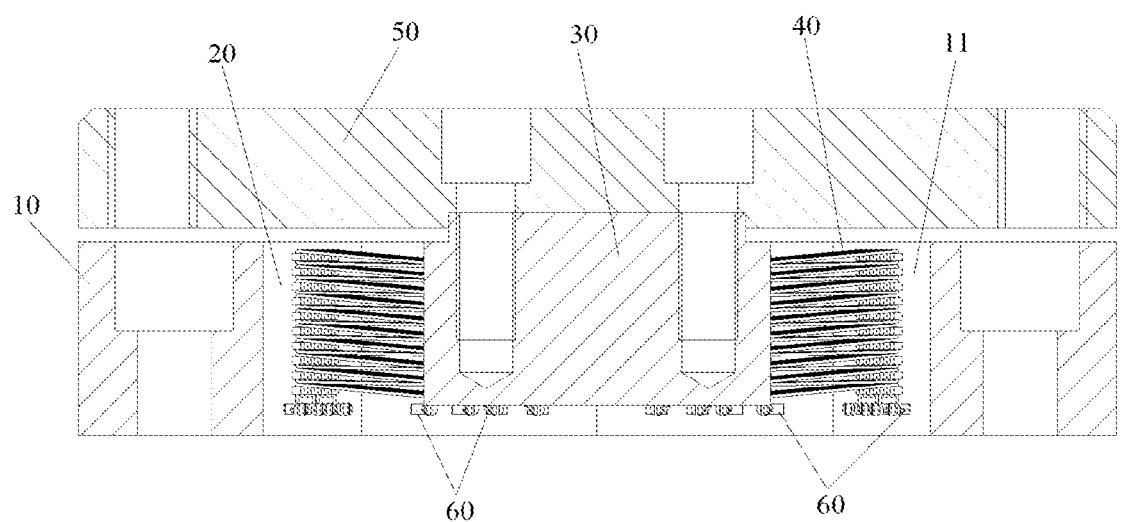
FIG. 2 is a sectional view of the strain sensor in FIG. 1.
Figure 3:
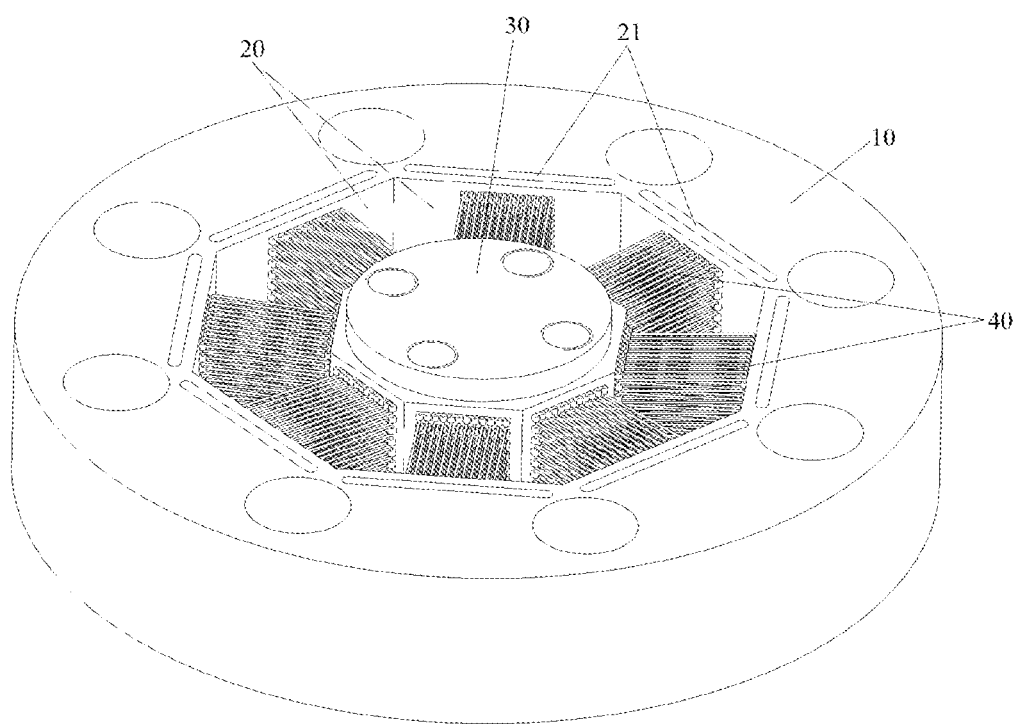
FIG. 3 is a structural schematic perspective view of the strain sensor in FIG. 1 with its cover removed.
Figure 4:
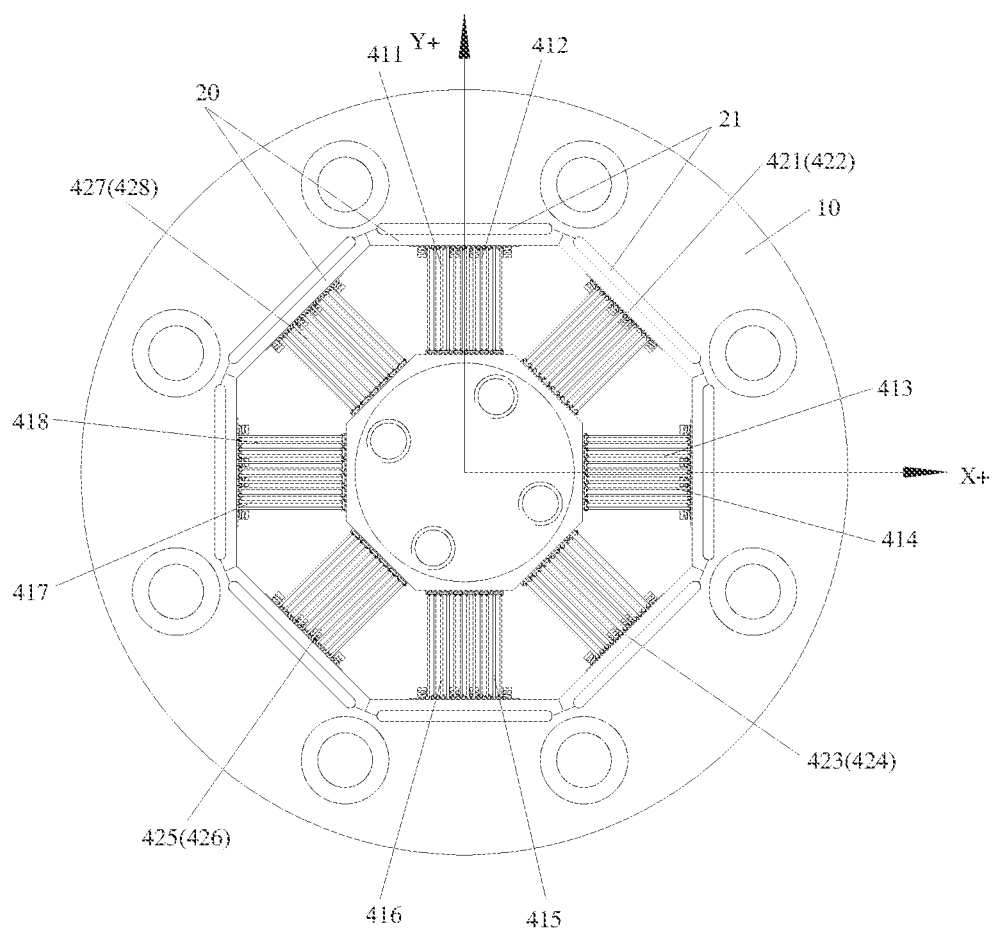
FIG. 4 is a top view of the strain sensor in FIG. 3 with its cover removed.

As shown in FIGS. 1 and 2, the strain sensor further includes a cover 50 covering the base 10 and the bearing structure 30. The bearing structure 30 includes a bearing body 32 and a winding body 33. The bearing body 32 is connected to and engaged with the cover 50. The winding body 33 is connected to the bearing body 32 and located at a side of the bearing body 32 away from the cover 50. The second winding part 31 is provided on an outer surface of the winding body 33. In this way, as the bearing body 32 and the cover 50 engage with each other, and the winding body 33 is configured to provide the second winding part 31, on one hand, the structural configuration of the bearing structure 30 is more reasonable and compact, and on the other hand, the structure of the bearing structure 30 is simpler and easy to be processed and realized, thereby decreasing the processing difficulty of the bearing structure 30.

In some embodiments, the cover 50 is configured to protect the bearing structure 30 and the wire set 40 and to prevent impurities such as dust from entering the mounting recess 11 and thus influencing the normal operation of the strain sensor. In addition, the above configuration makes the appearance of the strain sensor more beautiful and neater, thereby improving the visual experience of the user.

In some embodiments, the winding body 33 has a cross-section in shape of a polygon. There are a plurality of second winding parts 31 disposed correspondingly to a plurality of sides of the polygon in a one-to-one manner. In this way, the second winding parts 31 each are disposed on the sides corresponding thereto, so that the processing of the second winding parts 31 is easier and simpler, and the structure of the bearing structure 30 is simpler and easy to be processed and realized, thereby decreasing the processing difficulty of the bearing structure 30.

In this embodiment, the winding body 33 is in a structure of an octagonal prism. The number of the second winding parts 31 is eight. Eight second winding parts 31 are disposed correspondingly to eight sides of the octagonal prism in a one-to-one manner. Eight second winding parts 31 are disposed correspondingly to eight wire sets 40 in a one-to-one manner, so that the distribution of the wire sets 40 are more reasonable and compact, thereby decreasing the processing difficulty for the operator.

It should be noted that the number of sides of the bottom surface of the winding body 33 is not limited herein and may be adjusted according to operating conditions. In some embodiments, the winding body 33 is a quadrangular prism, a hexagonal prism, a decagonal prism, or a dodecagonal prism.

In some embodiments, a surface of the bearing structure 30 facing the cover 50 is higher than a surface of the base 10 facing the cover 50. Alternatively, the surface of the bearing structure 30 facing the cover 50 is flush with the surface of the base 10 facing the cover 50. In this way, in the detection process using the strain sensor, the above configuration ensures that the load applied onto the cover 50 can be directly applied onto the bearing structure 30 and then onto the wire set 40 through the bearing structure 30, so as to change the resistance of the wire set 40 to accomplish the detection action of the strain sensor.

In this embodiment, the surface of the bearing structure 30 facing the cover 50 is higher than the surface of the base 10 facing the cover 50. The cover 50 is connected to the bearing structure through a first fastener and to the base 10 through a second fastener. In some embodiments, the first fastener and the second fastener are screws or bolts, so that the attachment and the detachment between the cover 50 and the bearing structure 30 and between the cover 50 and the base 10 are easier and simpler, decreasing the difficulty of the attachment and the detachment.

In other embodiments which are not shown in the drawings, the surface of the bearing structure facing the cover is lower than the surface of the base facing the cover, so that the strain sensor can be used as a six-dimensional acceleration sensor.

As shown in FIG. 7, the mounting structure 20 has a plate structure. The plate structure incudes a first surface 23 and a second surface 24 opposite to the first surface 23. The first winding part 22 is disposed on the first surface 23. The second surface 24 is an arch-shaped surface. The pre-defined gap 21 is formed between the second surface 24 and the inner surface of the mounting recess 11. In this way, the above configuration not only makes the structure of the mounting structure 20 simpler and easy to be processed and realized, thereby decreasing the processing cost and the processing difficulty of the strain sensor, but also ensures that the pre-defined gap 21 can be formed between the mounting structure 20 and the inner surface of the mounting recess 11, and thus ensures the resistance of the wire set 40 is able to be changed, thereby increasing the operational reliability of the strain sensor.

In some embodiments, the mounting structure 20 is connected to the base 10 by a snap-fit or a fastener.

Figure 8:
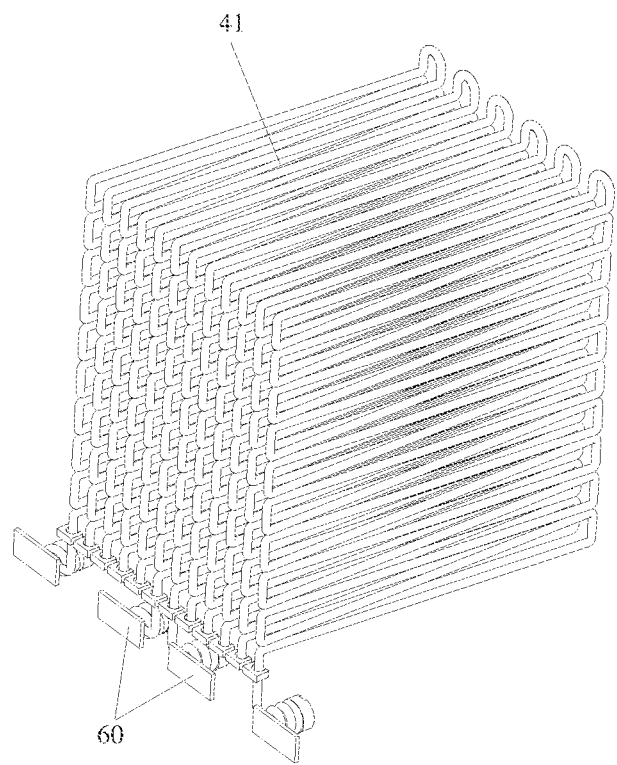
FIG. 8 is a structural schematic perspective view of a first wire sub-set and fixing structures assembled together of the strain sensor in FIG. 3.
Figure 9:
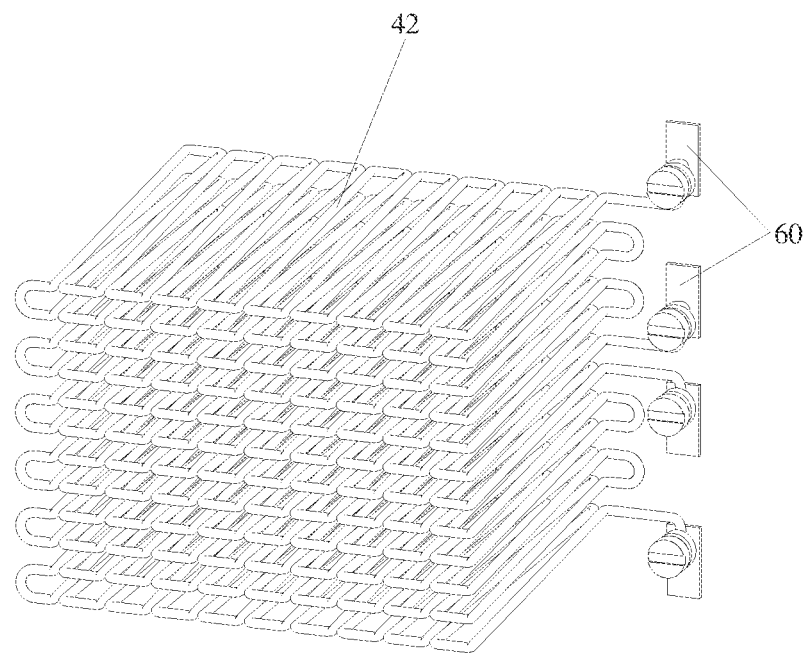
FIG. 9 is a structural schematic perspective view of a second wire sub-set and fixing structures assembled together of the strain sensor in FIG. 3.

As shown in FIG. 8 and FIG. 9, the wire set 40 includes a first wire sub-set 41 and a second wire sub-set 42. The first wire sub-set 41 includes at least two first wire parts arranged in a first pre-defined direction and spaced from each other. The second wire sub-set 42 includes at least two second wire parts arranged in a second pre-defined direction and spaced from each other. The first pre-defined direction and the second pre-defined direction are defined at an angle therebetween. In this embodiment, the first wire sub-set 41 includes two first wire parts arranged in the first pre-defined direction and spaced from each other, and the second wire sub-set 42 includes two second wire parts arranged in the second pre-defined direction and spaced from each other. In this way, the above configuration further increases the response speed of the strain sensor, prevents the phenomena such as creep and hysteresis of the strain sensor which may affect the detection sensitivity of the strain sensor, and also increases the detection precision of the strain sensor.

In some embodiments, the first wire sub-set 41 is wound by two wires winding into the first wire parts, respectively, and the two first wire parts are arranged in the first pre-defined direction and spaced from each other. The second wire sub-set 41 is wound by two wires winding into the second wire parts, respectively, and the two second wire parts are arranged in the second pre-defined direction and spaced from each other.

In some embodiments, there are a plurality of first wire sub-sets 41 and a plurality of second wire sub-sets 42. The first wire sub-sets 41 are arranged along an inner circumferential surface of the mounting recess 11 and spaced from each other. At least one second wire sub-set 42 is disposed between two adjacent first wire sub-sets 41. In this way, the above configuration further increases the detection sensitivity of the strain sensor and also increases the detection precision of the strain sensor.

In this embodiment, there are four first wire sub-sets 41 and four second wire sub-sets 42. The four first wire sub-sets 41 are arranged along the inner circumferential surface of the mounting recess 11 and spaced from each other. One second wire sub-set 42 is disposed between two adjacent first wire sub-sets 41. In this way, the above configuration makes the structural layout of the first wire sub-sets 41 and the second wire sub-sets 42 more reasonable and also increases the response speed of the strain sensor.

In some embodiments, a ratio of the measuring range of the strain sensor to a length of the wire of the first wire part is less than or equal to 0.0125 N/mm. In this way, the above value range can ensure the feasibility of the strain sensor and thus increases the operational reliability of the strain sensor.

In some embodiments, a ratio of the measuring range of the strain sensor to a length of the wire of the second wire part is less than or equal to 0.0125 N/mm. In this way, the above value range can ensure the feasibility of the strain sensor and thus increases the operational reliability of the strain sensor.

As shown in FIG. 8 and FIG. 9, the strain sensor further includes a plurality of fixing structures 60. The plurality of fixing structures 60 are disposed on the mounting structure 20. Ends of wires of the wire set 40 wind on the fixing structures 60, so that the ends of the wires are fixed by the fixing structures 60. In this way, the fixing structures 60 enable the wire set 40 to be tensioned and fixed, increase the system rigidity of the strain sensor, and can be indirectly used as a frequency modulating means, so that the strain sensor can be applicable to different operating conditions.

In some embodiments, the fixing structures 60 are pre-loaded screws.

In some embodiments, after the wires of the wire sets 40 pass through the first winding parts 22 and the second winding parts 31, the ends of the wires are tensioned by the preloaded screws, so that the preloaded screws play a role in bracing the bearing structure 30 to suspend the bearing structure 30 at the central portion of the base 10.

Figure 10:
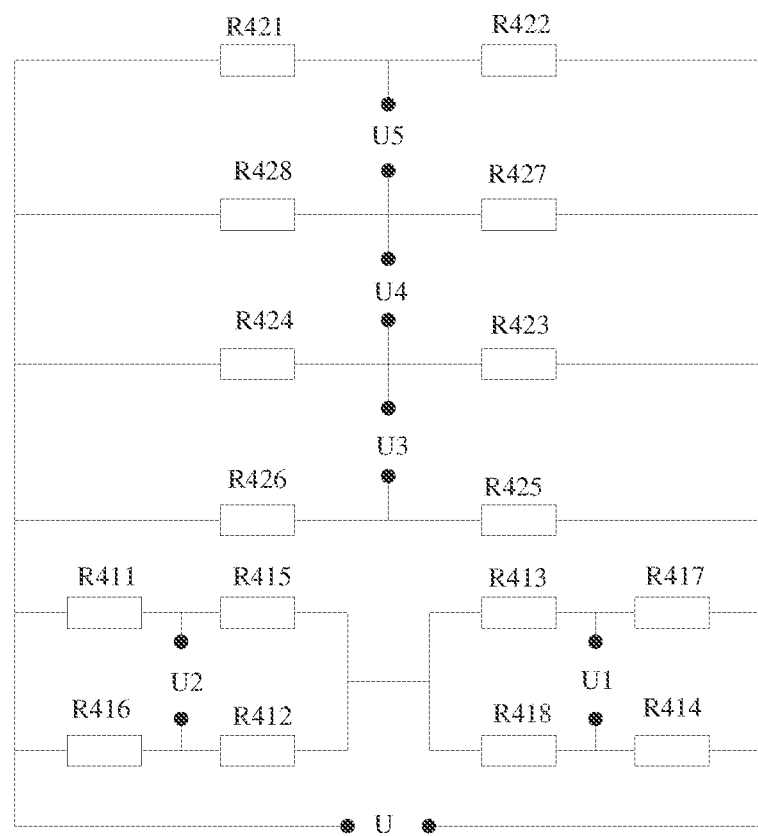
FIG. 10 is a circuit diagram illustrating a wire set of the strain sensor in FIG. 1.

As shown in FIGS. 8 to 10, the first wire sub-set 41 is formed by two first wire parts, the second wire sub-set 42 is formed by two second wire parts, and they are numbered anticlockwise for ease of description. The number in parentheses denotes the wire part behind in the viewing direction. The directions of X+ and Y+ are set as FIG. 6. The direction of Z+ is outwardly perpendicular to the paper.

As shown in FIG. 10, the third wire 421, the fourth wire 422, the fifteenth wire 427, the sixteenth wire 428, the eighth wire 424, the seventh wire 423, the twelfth wire 426, and the eleventh wire 425 are arranged as illustrated and constitute a parallel circuit, and a Wheatstone bridge is formed between each two of them. The first wire 411, the second wire 412, the ninth wire 415, and the tenth wire 416 constitute a first Wheatstone bridge, the fifth wire 413, the thirteenth wire 417, the fourteenth wire 418, and the sixth wire 414 constitute a second Wheatstone bridge, and then the first Wheatstone bridge is in series with the second Wheatstone bridge. In this series branch, there is a characteristic of $U_2$ being zero when $U_1$ changes. That is, the total resistance of one bridge circuit is unchanged when the other bridge circuit changes. The voltages $U_1$ and $U_2$ are measured to reflect the directions and the magnitudes of $F_X$, $F_Y$, and $M_Z$ applied. The voltages $U_3$, $U_4$, and $U_5$ are measured to reflect the directions and the magnitudes of $M_X$, $M_Y$, and $F_Z$ applied. The specific relationship is referred to the following equation:

$$\begin{bmatrix} F_x \\ F_y \\ M_z \\ M_x \\ M_y \\ F_z \end{bmatrix}_j = [K] \begin{bmatrix} U_1 \\ U_2 \\ U_1 + U_2 \\ U_3 \\ U_3 + U_4 \\ U_4 + U_5 \end{bmatrix}_j.$$

The embodiments of the present disclosure further provide a robot (not shown) including the above-described strain sensor.

It can be known from the above description that the embodiments of the present disclosure have the following technical effects.

The bearing structure is directly connected to the wire set. In the detection process using the strain sensor, the load is directly applied onto the wire set through the bearing structure to take maximum advantage of the resistance strain effect of the wire set, which makes the response of the strain sensor more sensitive, eliminates the affection of the creep and the hysteresis of an elastomer on the detection sensitivity of the strain sensor, and thus solves the problem that the strain sensor in the related art has phenomena such as creep, hysteresis, and shift which affect the detection sensitivity thereof, thereby increasing the detection sensitivity and the response speed of the strain sensor and also increasing the detection precision of the strain sensor.

Apparently, the embodiments described above are merely some, but not all, of the embodiments of the present disclosure. Based on the embodiments of the present disclosure, all other embodiments obtained by a person of ordinary skill in the art without paying any creative effort shall be included in the protection scope of the present disclosure.

It is to be noted that terms, as used herein, are merely for describing the specific implementations, and not intended to limit the exemplary implementations of the present application. Unless otherwise specifically stated, the singular as used herein is intended to include the plural. Furthermore, it should be understood that terms "including" and/or "comprising", as used herein, indicate the presence of features, steps, tasks, devices, components, and/or combinations thereof.

It is to be noted that terms such as "first" and "second", as used in the description, claims and drawings of the present application, are used to distinguish similar objects, and are not necessarily used to define a particular order or sequence. It should be understood that data, as used in such a way, may be used interchangeably if appropriate, so that the implementations of the present application described here may be implemented in an order other than those illustrated or described here.

The foregoing content merely describes preferred embodiments of the present invention and is not intended to limit the present invention. For a person of ordinary skill in the art, the present invention may have various alterations and changes. Any modifications, equivalent replacements and improvements made within the spirit and principle of the present invention shall fall into the protection scope of the present invention.

What is claimed:

1. A strain sensor, comprising:
   a base provided with a mounting recess;
   a mounting structure disposed on the base and located in the mounting recess, a pre-defined gap being formed between the mounting structure and an inner surface of the mounting recess;
   a bearing structure mounted in the mounting recess and located outside the pre-defined gap; and
   a wire set of a plurality of electrically conductive wires, at a side of the wire set each of the wires being fixedly disposed on the bearing structure, and at another side of the wire set each of the wires being fixedly disposed on the mounting structure to detect strain based on change of resistance of the wire set by a load applied through the bearing structure on the wire set.

2. The strain sensor of claim 1, comprising a plurality of wire sets and a plurality of mounting structures, wherein the plurality of wire sets are arranged along an inner circumference of the mounting recess and spaced from each other, and the plurality of mounting structures are disposed correspondingly to the plurality of wire sets.

3. The strain sensor of claim 1, wherein the mounting structure is provided with a first winding part thereon, the first winding part comprises a plurality of first protrusions arranged in at least one of a first pre-defined direction and a second pre-defined direction and spaced from each other, the first protrusions are provided with first wire passing holes configured to allow the wire set to pass therethrough, and the first pre-defined direction and the second pre-defined direction are defined at an angle therebetween.

4. The strain sensor of claim 3, wherein the mounting structure has a plate structure, the plate structure comprises a first surface and a second surface opposite to the first surface, the first winding part is disposed on the first surface, the second surface is an arch-shaped surface, and the pre-defined gap is formed between the second surface and the inner surface of the mounting recess.

5. The strain sensor of claim 3, wherein the first pre-defined direction is perpendicular to the second pre-defined direction.

6. The strain sensor of claim 3, wherein the first pre-defined direction is a height direction of the strain sensor, and each of the first wire passing holes extends in the first pre-defined direction.

7. The strain sensor of claim 1, wherein the bearing structure is provided with a second winding part thereon, the second winding part comprises a plurality of second protrusions arranged in at least one of a first pre-defined direction and a second pre-defined direction and spaced from each other, the second protrusions are provided with second wire passing holes configured to allow the wire set to pass therethrough, and the first pre-defined direction and the second pre-defined direction are defined at an angle therebetween.

8. The strain sensor of claim 7, further comprising a cover covering the base and the bearing structure, wherein the bearing structure comprises:
 a bearing body connected to and engaged with the cover; and
 a winding body connected to the bearing body and located at a side of the bearing body away from the cover, the second winding part being disposed on an outer surface of the winding body.

9. The strain sensor of claim 8, wherein the winding body has a cross-section in shape of a polygon, there are a plurality of second winding parts, and the plurality of second winding parts are disposed correspondingly to a plurality of sides of the polygon in a one-to-one manner.

10. The strain sensor of claim 8, wherein a surface of the bearing structure facing the cover is higher than a surface of the base facing the cover.

11. The strain sensor of claim 8, wherein a surface of the bearing structure facing the cover is flush with a surface of the base facing the cover.

12. The strain sensor of claim 1, wherein the wire set comprises:
 a first wire sub-set comprising at least two first wire parts arranged in a first pre-defined direction and spaced from each other; and
 a second wire sub-set comprising at least two second wire parts arranged in a second pre-defined direction spaced from each other, the first pre-defined direction and the second pre-defined direction being defined at an angle therebetween.

13. The strain sensor of claim 12, wherein there are a plurality of first wire sub-sets and a plurality of second wire sub-sets, the plurality of first wire sub-sets are arranged along an inner circumferential surface of the mounting recess and spaced from each other, and at least one second wire sub-set is disposed between two adjacent first wire sub-sets.

14. The strain sensor of claim 12, wherein a ratio of a measuring range of the strain sensor to a length of the wire of the first wire part is less than or equal to 0.0125 N/mm.

15. The strain sensor of claim 12, wherein a ratio of a measuring range of the strain sensor to a length of the wire of the second wire part is less than or equal to 0.0125 N/mm.

16. The strain sensor of claim 1, wherein the strain sensor further comprises:
 a plurality of fixing structures disposed on the mounting structure, ends of wires of the wire set wind on the fixing structures, so that the ends of the wires are fixed by the fixing structures.

17. The strain sensor of claim 16, wherein each of the plurality of fixing structures is a preloaded bolt.

18. A robot, comprising the strain sensor of claim 1.

19. The strain sensor of claim 7, wherein the first pre-defined direction is a height direction of the strain sensor, and each of the second wire passing holes extends in the first pre-defined direction.

20. The strain sensor of claim 8, wherein a surface of the bearing structure facing the cover is lower than a surface of the base facing the cover.

* * * * *